(12) United States Patent
Mattoon et al.

(10) Patent No.: US 6,655,835 B2
(45) Date of Patent: Dec. 2, 2003

(54) SETTING-FREE RESISTIVE TEMPERATURE DEVICE (RTD) MEASURING MODULE

(75) Inventors: Carl Vincent Mattoon, Lewiston, ID (US); David James Dolezilek, Pullman, WA (US)

(73) Assignee: Schweitzer Engineering Laboratories Inc., Pullman, WA (US)

( * ) Notice: Subject to any disclaimer, the term of this patent is extended or adjusted under 35 U.S.C. 154(b) by 0 days.

(21) Appl. No.: 09/469,841

(22) Filed: Dec. 21, 1999

(65) Prior Publication Data

US 2002/0075938 A1 Jun. 20, 2002

(51) Int. Cl.[7] .................................................. G01K 7/00
(52) U.S. Cl. ........................................ 374/183; 374/166
(58) Field of Search .................................. 374/183, 166

(56) References Cited

U.S. PATENT DOCUMENTS

| | | | | |
|---|---|---|---|---|
| 5,143,452 A | * | 9/1992 | Maxedon et al. | 374/170 |
| 5,746,511 A | * | 5/1998 | Eryurek et al. | 374/2 |
| 5,857,777 A | * | 1/1999 | Schuh | 374/183 |
| 5,929,344 A | * | 7/1999 | Hays et al. | 374/183 |
| 5,969,639 A | * | 10/1999 | Lauf et al. | 340/870.17 |
| 6,045,260 A | * | 4/2000 | Schwartz et al. | 374/183 |
| 6,244,744 B1 | * | 6/2001 | Calvin | 374/183 |
| 6,425,687 B1 | * | 7/2002 | Kulczyk | 374/166 |

* cited by examiner

Primary Examiner—Diego Gutierrez
Assistant Examiner—Yaritza Guadalupe
(74) Attorney, Agent, or Firm—Jensen & Puntigam

(57) ABSTRACT

The apparatus which is located separately from the RTD includes means for measuring the resistance of a plurality of RTDs present at a selected site, the RTDs being those of a number of different RTD types. The module includes means for storing the resistance/temperature map for each of the plurality of RTDs and for determining the temperatures associated with said resistances from the resistance/temperature maps. The resulting plurality of temperatures for each RTD, respectively, is then transmitted in a known order to a remote protective relay which determines the correct temperature for each RTD connected to the module.

10 Claims, 1 Drawing Sheet

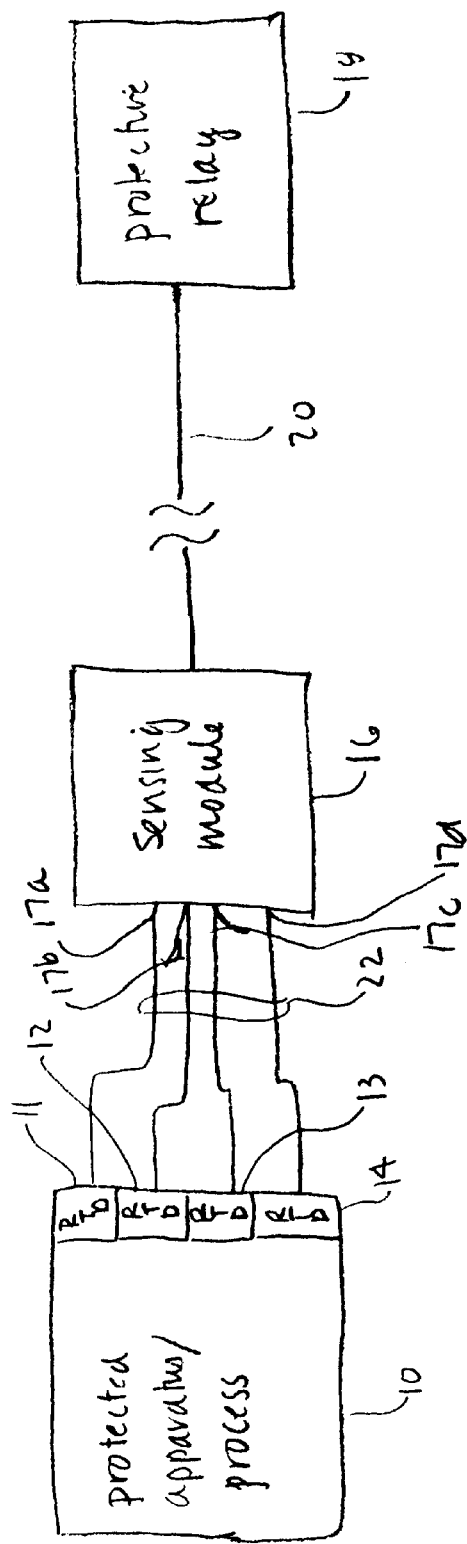

SETTING-FREE RESISTIVE TEMPERATURE DEVICE (RTD) MEASURING MODULE

TECHNICAL FIELD

This invention relates generally to resistive temperature devices (RTDs) and more specifically concerns a RTD measuring module which is part of a specific system arrangement involving a RTD, an RTD measuring module and a remote device such as a protective relay, which uses the RTD information from the RTD measuring module.

BACKGROUND OF THE INVENTION

A resistive temperature device (RTD) is a resistor which has a positive temperature coefficient (i.e. the resistance of an RTD increases as the external temperature increases and decreases as the temperature decreases). The variation in resistance for a given RTD is known over a selected range of temperatures. An accompanying device, usually referred to as a sensing or measuring module, is used to determine the external temperature (the temperature in the immediate vicinity of the RTD) by first measuring the RTD resistance and then determining the temperature using a lookup table or similar technique which associates temperature and resistance for that particular category of RTD, based on its particular temperature coefficient. Thus, the RTDs and their associated measuring modules are used when it is desirable to accurately measure temperature at a particular location.

There are many applications for RTD devices, including the determination of ambient temperature at locations where the reading of a conventional temperature gauge is impossible or inconvenient, as well as determining change in temperature in concealed parts of certain apparatus, such as transformers, generators and motors. The outputs from the RTD measuring modules can be used to control the operation of such apparatus, and various processes as well.

In motor protection, for instance, RTDs are used to detect the operating temperatures of the motor bearings and the stator windings as well as the temperature of the incoming (cooling) air. It is important to know such operating temperatures to prevent overheating of the apparatus. Different types of RTDs are used for particular applications. Several different types of RTDs may be used in a single apparatus to monitor the temperatures of different parts of the apparatus. The different types of RTDs are discussed in more detail below.

RTD measuring circuits (modules) are often present in protective relays which are used to protect the operation of various apparatus. When the measuring module recognizes that the temperature in a particular RTD location is out of range, it will change the operation of the apparatus (such as by reducing speed) or temporarily stop operation by means of a circuit breaker.

In a typical case, the protective relay is located a substantial distance (hundreds of feet in some cases) from the protected apparatus; a long, shielded, multiconductor cable is required between the RTDs and the RTD measuring circuitry (module) in the relay. Such an arrangement increases the installation cost of the RTD system and creates a slight risk of protective relay damage in the event of winding insulation failure in the protected apparatus. Attempting to locate the protective relay closer to the protected apparatus to reduce such cost is often difficult to accomplish, while locating the RTD measuring module separate from the relay creates significant communication and RTD setting burdens associated with the measuring module.

Hence, it is desirable to reduce the cost of the connection between the measuring module and the RTDs in the protected apparatus without changing the location of the protective relay.

DISCLOSURE OF THE INVENTION

Accordingly, the present invention is a setting-free temperature-measuring module apparatus for a first plurality of resistive temperature devices (RTDs) connected thereto, comprising: means for measuring the resistance of said first plurality of RTDs present at selected sites where temperature is to be monitored; means for storing the resistance/temperature maps for a selected number of different types of RTDs, which includes at least those types comprising said first plurality of RTDs; processing means for determining temperature values associated with said resistances from the resistance/temperature maps stored in the module; and means for transmitting all the determined temperatures for said first plurality of RTDs to a remote device which determines the correct temperature for each of said first plurality of RTDs.

BRIEF DESCRIPTION OF THE DRAWINGS

The FIGURE shows a schematic view of the system of the present invention.

BEST MODE FOR CARRYING OUT THE INVENTION

Referring now to the FIGURE, an apparatus with at least one RTD is shown generally at 10. Apparatus 10 could be any one of several different devices, including for instance, a motor, a generator or a transformer, among others. RTDs can also be used to monitor temperature at various points in a process. Apparatus 10 can include several different types of RTDs, for accurate detection of temperature at various locations in the apparatus. Presently, there are four major types of RTDs used in motor protection applications. These include 100 Ohm platinum, 100 Ohm nickel, 120 Ohm nickel and 10 Ohm copper. The Ohm values refer to the resistance of the particular RTD element at 0° C. The particular metal used in an RTD is used as the RTD identifier. Since the metal comprising the RTD has a specific known temperature profile (change in resistance relative to temperature change), the resistance/temperature profile for each type of RTD is known and predictable.

As indicated above, particular RTDs are better suited than others for selected applications/locations within the protected apparatus. For instance, a motor may be equipped with 120 or 100 ohm nickel based RTDs, and bearings with 10 Ohm copper RTDs. Ambient temperature sensing can be accomplished with 100 Ohm platinum RTDs. In each case, however, the resistance of the RTD at a particular site will vary depending upon the temperature at that site and will be determined by a measuring module.

Referring again to FIG. 1, the system includes a separate sensing (measuring) module 16 which is located relatively close to the site of the RTDs in the protected apparatus. A conventional shielded, multiconnector cable 22 is used for transmission of the RTD resistance information to module 16. Again, several RTDs could be present in a particular protected apparatus. Positioned remotely from the separate sensing module 16 is a protective relay or similar device 18, which uses the temperature information determined by the sensing module 16. The information from sensing module 16 is processed by the relay 18 to ensure that the temperature in the RTD area is within a prescribed "safe" range. If the portion of the apparatus associated with the RTD begins to overheat, the relay can take appropriate steps to reduce the overheating. There are many examples of various conventional actions a relay might take in a particular situation responsive to temperature information provided by an RTD.

In the present example, four RTDs 11–14 are shown in the apparatus, for purposes of explanation. It should be understood, however, that a different number of RTDs could be used. In the example herein the four RTDs are all different. Measuring module 16 will measure the resistance, at selected times, of each RTD. The circuitry in module 16 to measure the resistance of the RTDs is conventional and is therefor not discussed in detail. The resistance information from the RTDS, as indicated above, is transmitted over a shielded multiconnector line 22. Module 16 then takes each measured value of resistance in turn and calculates the associated temperature, using the temperature profile for each of the RTDs in the apparatus, i.e. the resistance value for each RTD will result in four temperature values, one for each possible RTD.

The determination of temperature information is typically accomplished in software, along with storage of the resistance/temperature profile for all four RTDs. Again, it should be understood that a different number of different RTDs could be used.

Thus, in the embodiment shown, four temperature values for each RTD will be determined from the resistance/temperature values. The number of total temperature values will depend upon the number of RTDs connected to the module multiplied by the number of temperature values for each RTD. For instance, if there are four RTDs and four temperature values determined for each RTD, there will be a total of 16 temperature values transmitted to the relay in a given data transmission. As another example, if 12 RTDs are used, the total number of temperature values will be 48.

After the temperature determinations have been made, module 16 will transmit to the remote relay 18 all of the temperature values for every RTD connected to the module, with the temperature values for each RTD being in a specific known order. This information is transmitted to protective relay 18 over a fiber-optic or similar inexpensive channel 20. The overall system is arranged such that the distance covered by the expensive shielded connector between the protected apparatus 10 which contains the RTDs and the measuring module 16 is fairly short (on the order of 4 meters), while the distance covered by the inexpensive fiber connector between measuring module 16 and the relay 18 is a much greater distance (on the order of 500 meters).

Upon receipt of the data packet of temperature information from the module 16, relay 18 will first review its settings, which indicates the particular type of RTD connected to each input connection on the module 16. Thus the relay knows the type of RTD for each successive group of temperature data and further knows the specific order in which the temperatures for each RTD was transmitted. The settings for the RTDs are accomplished at the relay only, instead of at both the relay and the measuring module.

Once the RTD for a particular input connection is identified, and since the order for the temperature values is known, the relay can determine the actual correct temperature from the RTD temperature data transmitted. For instance, referring to the FIGURE, the RTD temperature data for each input connection is transmitted to the relay in a particular known sequence. The relay knows the particular RTD connected to that input to the measuring module, i.e, the relay knows because of its settings that, for instance, a 100 Ohm nickel RTD is connected to input connection 17a. Further, since the temperature information is transmitted in a particular order, e.g. 100 Ohm nickel temperature, 120 Ohm nickel, 100 Ohm platinum and 10 Ohm copper, the relay then knows which of the four temperature values is the correct one for each input connection. This analysis is repeated for each input connection in turn (17a–17d) (and the set of temperatures associated therewith), until the correct temperatures for the RTD at each input connection to the measuring module have been determined.

The relay also knows the particular physical site of the RTD connected to each input; accordingly the actual temperature from that RTD, now known to the relay, is evaluated in conventional fashion by the relay to determine whether or not the specific temperature at that site is within the pre-selected range of proper operation for that portion of the protected apparatus. If the temperature is within the selected range, the operation of the apparatus continues in normal fashion. However, if the temperature is outside the selected range, indicating for instance that the site is overheating, then the relay produces control signals which interrupt or change the operation of the apparatus appropriately to correct the temperature. Hence, relay 18, following identification of the RTD for a particular site and the temperature at that RTD as explained above, operates in its normal protective mode.

Hence, an RTD measurement module, and a system of RTD operation and measurement have been disclosed. The measurement module can be positioned relatively close to the site of the RTD, with only a short distance thus necessary for the more expensive, shielded cabling. Temperature information is determined by the module and transmitted over less expensive fiber of similar material to a remote protective relay, where the correct temperature information for each RTD in the protective device is determined and then processed to determine in-range operation of the protected device. Hence, the present invention decreases the overall cost and complexity of the RTD system. A measuring module may be positioned relatively close to the protected apparatus, but does not itself require a setting capability. All the settings are accomplished at the protective relay.

As discussed above, the number of RTDs and the number of temperature values determined for each RTD can be varied, although the number of temperature values will always be at least two. Further, the temperature values may be actual temperatures, i.e. in degrees centigrade, or may be values representative of temperature values which can be recognized as specific temperatures at the relay. Still further, in some situations, it may be possible to simply apply a set of known, selected gain factors for each type of RTD (e.g. 4) to each resistance value and transmit that information to the relay, which will then convert it to temperature information. Further, the principles of the present invention could be applied to thermocouple devices.

Although a preferred embodiment of the invention has been disclosed herein for illustration, it should be understood that various changes, modifications and substitutions may be incorporated in such embodiment without departing from the spirit of the invention, which is defined by the claims as follows.

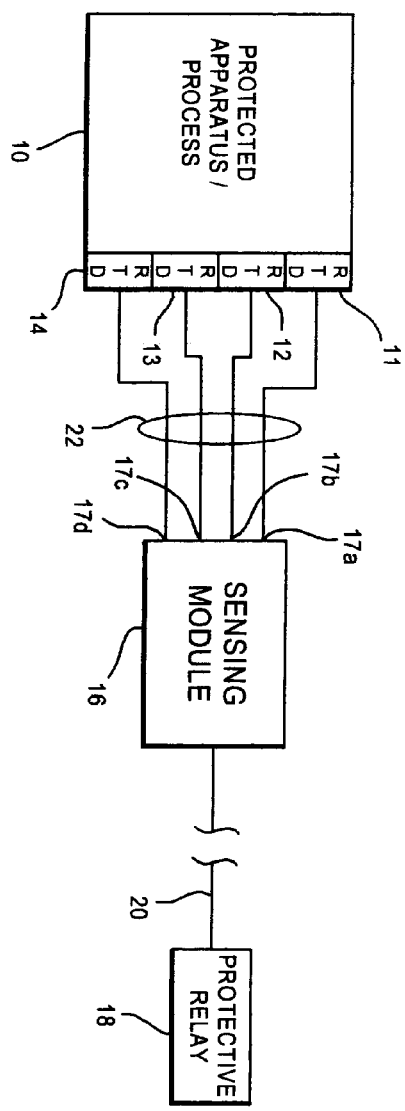

What is claimed is:

1. A setting-free, temperature-measuring module apparatus for a first plurality of resistive temperature devices (RTDs) connected thereto, comprising:

means for measuring the resistance of said first plurality of RTDs present at selected sites where temperature is to be monitored;

means for storing a plurality of resistance/temperature maps for a selected number of different types of RTDs, including temperature maps for at least those types comprising said first plurality of RTDs;

processing means for determining a plurality of different temperature values for each resistance value measured by processing each resistance value with each of the resistance/temprature maps for each of said first plurality of RTD's and means for transmitting in a known order the plurality of different temperatures for each of said first plurality of RTDs to a remote device which determines the correct temperature for each of said first plurality of RTDs from the plurality of temperatures transmitted for each RTD.

2. An apparatus of claim 1, wherein there are at least four temperature values transmitted for said first plurality of RTDs.

3. An apparatus of claim 1, wherein the identity of the RTD connected to each input connection of the module is known by the remote device and unknown by the module.

4. A system, which includes a setting-free, temperature-measuring module apparatus, for obtaining temperature data for a first plurality of resistive temperature devices (RTDs) connected thereto, comprising:

means for measuring the resistance of said first plurality of RTDs present at selected sites where temperature is to be monitored;

means for storing in the module a plurality of resistance/temperature maps for a selected number of different types of RTDs, including temperature maps for at least those types comprising said first plurality of RTDs;

processing means for determining a plurality of different temperature values for each resistance value measured by processing each resistance value with each of the resistance/temperature maps for each of said plurality of RTDs;

means for transmitting in a known order the plurality of different temperatures for each of said first plurality of RTDs to a remote device; and a remote device for receiving said transmitted temperatures and for selecting the correct temperature for each of said first plurality of RTDs from the plurality of different temperatures transmitted for each RTD.

5. A system of claim 4, wherein the RTD module is located relatively close to the selected sites for the RTDs, wherein the RTDs are connected to said module by a multiconnector line, and wherein the module is connected to the remote device by an inexpensive cable.

6. A system of claim 5, wherein the inexpensive cable is fiber-optic cable.

7. A system of claim 4, wherein the identity of the RTD connected to each input connection of the module is known by the remote device and is unknown by the module.

8. A system of claim 4, wherein there are at least four temperature values transmitted for each of said first plurality of RTDs.

9. A method for obtaining and evaluating temperature data from a first plurality of RTDs connected to a temperature-measuring module apparatus, comprising the steps of:

measuring the resistance of said first plurality of RTDs present at selected sites where temperature is to be monitored, wherein the temperature-measuring module is positioned close to the site of the RTDs;

storing a plurality of resistance/temperature maps for a selected number of different types of RTDs in the module, including at least those types comprising said first plurality of RTDs;

determining a plurality of different temperature values for each resistance value measured by processing each resistance value with each of the temperature maps for each said first plurality of RTDSs;

transmitting in a known order the plurality of different determined temperatures for said first plurality of RTDs to a protective relay device which determines the correct temperature for each of said first plurality of RTDs from the plurality of different temperatures transmitted for each RTD, wherein the protective relay device is remote from the site of the RTDs.

10. A method of claim 9, wherein the identity of the RTD connected to each input connection of the module is known by the remote device and is unknown to the temperature measuring module.

* * * * *

UNITED STATES PATENT AND TRADEMARK OFFICE
CERTIFICATE OF CORRECTION

PATENT NO.    : 6,655,835 B2
DATED         : December 2, 2003
INVENTOR(S)   : Carl Vincent Mattoon and David James Dolezilek It is certified that error appears in the above-identified patent and that said Letters Patent is hereby corrected as shown below:

Drawings,
Substitute figure 1 with the attached drawing.

Signed and Sealed this

Seventh Day of September, 2004

JON W. DUDAS
*Director of the United States Patent and Trademark Office*